United States Patent
Huang et al.

(10) Patent No.: US 10,419,763 B2
(45) Date of Patent: Sep. 17, 2019

(54) METHOD AND APPARATUS OF CONTEXT MODELLING FOR SYNTAX ELEMENTS IN IMAGE AND VIDEO CODING

(71) Applicant: MediaTek Singapore Pte. Ltd., Singapore (SG)

(72) Inventors: Han Huang, Beijing (CN); Jicheng An, Beijing (CN); Kai Zhang, Beijing (CN); Chih-Wei Hsu, Taipei (TW)

(73) Assignee: MEDIATEK SINGAPORE PTE LTD, Singapore (SG)

( * ) Notice: Subject to any disclaimer, the term of this patent is extended or adjusted under 35 U.S.C. 154(b) by 3 days.

(21) Appl. No.: 15/758,863

(22) PCT Filed: Sep. 5, 2016

(86) PCT No.: PCT/CN2016/098017
§ 371 (c)(1),
(2) Date: Mar. 9, 2018

(87) PCT Pub. No.: WO2017/041676
PCT Pub. Date: Mar. 16, 2017

(65) Prior Publication Data
US 2018/0288416 A1 Oct. 4, 2018

(30) Foreign Application Priority Data
Sep. 10, 2015 (WO) ................ PCT/CN2015/089346

(51) Int. Cl.
*H04N 19/13* (2014.01)
*H04N 19/176* (2014.01)
(Continued)

(52) U.S. Cl.
CPC ........... *H04N 19/13* (2014.11); *H04N 19/167* (2014.11); *H04N 19/176* (2014.11); *H04N 19/18* (2014.11);
(Continued)

(58) Field of Classification Search
CPC .... H04N 19/176; H04N 19/70; H04N 19/196; H04N 19/18; H04N 19/167; H04N 19/13; H04N 19/436
See application file for complete search history.

(56) References Cited

U.S. PATENT DOCUMENTS

| 8,902,988 B2 * | 12/2014 | Sole Rojals | H04N 19/176 |
| | | | 375/240.18 |
| 2005/0123207 A1 * | 6/2005 | Marpe | H04N 19/196 |
| | | | 382/239 |

(Continued)

FOREIGN PATENT DOCUMENTS

WO 2006/112620 A1 10/2006

OTHER PUBLICATIONS

International Search Report dated Nov. 21, 2016, issued in application No. PCT/CN2016/098017.
(Continued)

*Primary Examiner* — Neil R Mikeska
(74) *Attorney, Agent, or Firm* — McClure, Qualey & Rodack, LLP (57) ABSTRACT

A method and apparatus of video and image coding using context modeling for video and image are disclosed. A selected context is determined from a context set for a first syntax element at a first location based on statistics of one or more second syntax elements at one or more second locations within a predefined region. The first syntax element is different from the second syntax element. The first syntax element is then encoded or decoded according to the selected context. In one embodiment, the context modelling is applied to transform coefficients. The first syntax element corresponds to coeff_abs_level_greater1_flag and the second syntax element corresponds to significant_coeff_flag.

20 Claims, 3 Drawing Sheets

(51) Int. Cl.
*H04N 19/70* (2014.01)
*H04N 19/196* (2014.01)
*H04N 19/18* (2014.01)
*H04N 19/167* (2014.01)
*H04N 19/436* (2014.01)

(52) U.S. Cl.
CPC ........... *H04N 19/196* (2014.11); *H04N 19/70* (2014.11); *H04N 19/436* (2014.11)

(56) References Cited

U.S. PATENT DOCUMENTS

| | | | |
|---|---|---|---|
| 2005/0169374 A1* | 8/2005 | Marpe | H04N 19/176 375/240.16 |
| 2009/0238278 A1 | 9/2009 | Mauchly et al. | |
| 2013/0003824 A1 | 1/2013 | Guo et al. | |
| 2013/0027230 A1* | 1/2013 | Marpe | H03M 7/4006 341/107 |
| 2013/0114731 A1* | 5/2013 | Lee | H04N 19/176 375/240.18 |
| 2013/0182757 A1* | 7/2013 | Karczewicz | H04N 19/70 375/240.02 |
| 2013/0188684 A1* | 7/2013 | Terada | H04N 19/70 375/240.02 |
| 2013/0188698 A1 | 7/2013 | Chien et al. | |
| 2014/0003534 A1 | 1/2014 | Haque et al. | |
| 2014/0098878 A1 | 4/2014 | Guillemot et al. | |
| 2014/0198841 A1* | 7/2014 | George | H04N 19/52 375/240.03 |
| 2014/0210652 A1* | 7/2014 | Bartnik | H03M 7/40 341/67 |
| 2014/0307801 A1* | 10/2014 | Ikai | H04N 19/91 375/240.18 |
| 2015/0078447 A1* | 3/2015 | Gamei | H04N 19/122 375/240.12 |

OTHER PUBLICATIONS

Chuang, T.D., et al.; "Non-CE11 Block-based significance map context selection;" Joint Collaborative Team on Video Coding (JCT-VC) of ITU-T SG16 WP3 and ISO/IEC JTC1/SC29/WG11; Feb. 2012; pp. 1-5.

Chien, W.J., et al.; "Context assignment for parallel coefficient level coding;" Joint Collaborative Team on Video Coding (JCT-VC) of ITU-T SG 16 WP 3 and ISO/IEC JTC 1/SC 29/WG 11; Jul. 2012; pp. 1-6.

Sze, V., et al.; "High Throughput CABAC Entropy Coding in HEVC;" IEEE Transactions on Circuits and Systems for Video Technology; vol. 22; No. 12; Dec. 2012; pp. 1778-1791.

Weinberger, M.J., et al.; "LOCO-I: A Low Complexity, Context-Based, Lossless Image Compression Algorithm;" IEEE; 1996' pp. 140-149.

* cited by examiner

METHOD AND APPARATUS OF CONTEXT MODELLING FOR SYNTAX ELEMENTS IN IMAGE AND VIDEO CODING

CROSS REFERENCE TO RELATED APPLICATIONS

The present invention claims priority to PCT Patent Application, Serial No. PCT/CN2015/089346, filed on Sep. 10, 2015. The PCT Patent Application is hereby incorporated by reference in its entirety.

FIELD OF THE INVENTION

The present invention relates to entropy coding of video and image data. In particular, the present invention relates to context modelling of syntax elements in image and video coding.

BACKGROUND AND RELATED ARTS

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

Figure 1:
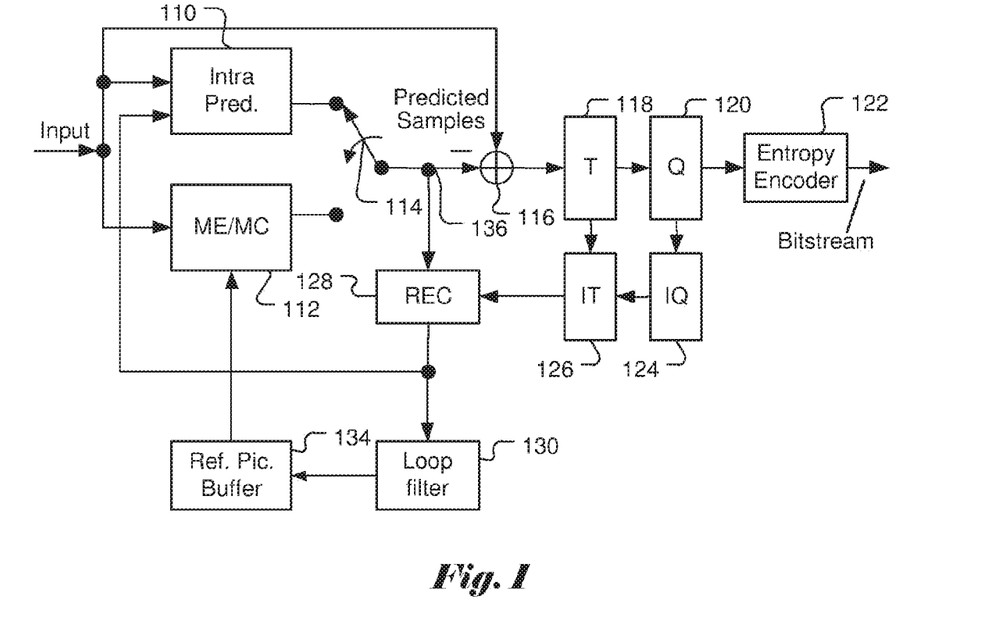
FIG. 1 illustrates an exemplary adaptive Inter/Intra video encoding system using transform, quantization and loop processing.

FIG. 1 illustrates an exemplary adaptive Inter/Intra video coding system incorporating loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data are stored in Reference Picture Buffer 134 and used for prediction of other frames. However, loop filter 130 (e.g. deblocking filter and/or sample adaptive offset, SAO) may be applied to the reconstructed video data before the video data are stored in the reference picture buffer.

Figure 2:
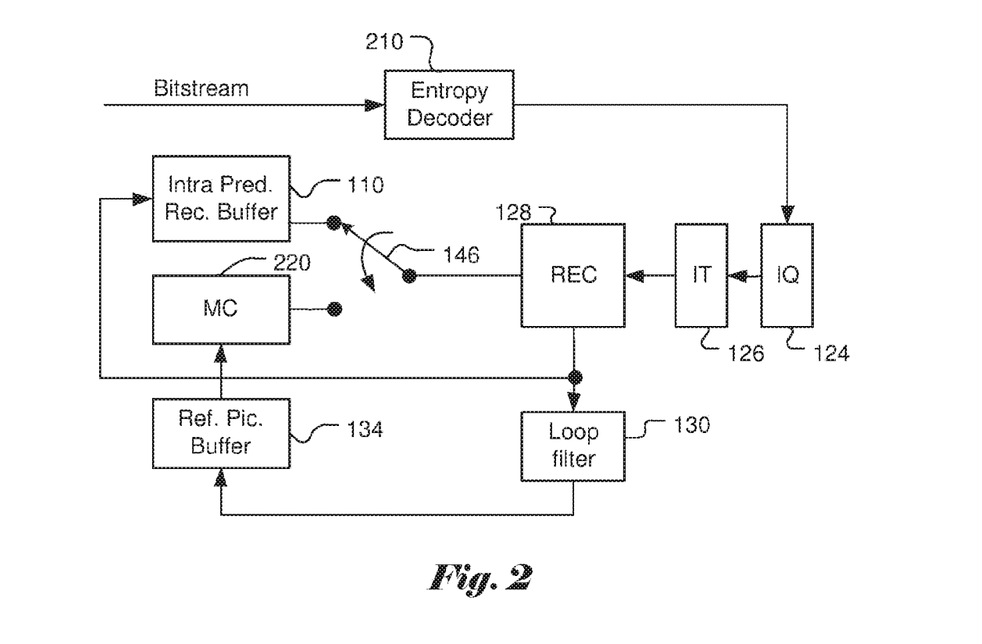
FIG. 2 illustrates an exemplary adaptive Inter/Intra video decoding system using transform, quantization and loop processing.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoder 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization (IQ) 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Furthermore, the basic unit for transform coding is square size named Transform Unit (TU). A Coding Group (CG) is defined as a set of 16 consecutive coefficients in scan order.

In image and video coding, various syntax elements related to residuals or side information are generated. These syntax elements are coded and incorporated into the video bitstream. In order to code these syntax elements efficiently, entropy coding is often used to code the syntax element or some of these syntax element. In the conventional context modelling, the context modelling is always based on coded bins, which cause data dependency during the coding process. It is desirable to develop new context modelling that will not have such data dependency.

In the following, an example of context modelling is illustrated based on the transform coefficient coding in the existing HEVC standard. The context modelling for the transform coefficients is intended to demonstrate issues in existing context modelling. The scope that the present invention intends to address includes image and video data in general instead of the transform coefficients specifically.

For a given scan order, a CG corresponds to a 4×4 sub-block. A syntax element coded_sub_block_flag is signalled for each to indicate whether the sub-block contains non-zero coefficients. If the sub-block is significant as indicated by the corresponding flag, then the coefficient significant flag, sign flag, and absolute level of the sub-block are further coded by up to five coefficient scan paths. Each coefficient scan path codes a syntax element within a CG, when necessary, as follows:

1) significant_coeff_flag: significance of a coefficient (zero/non-zero)
2) coeff_abs_level_greater1_flag: a flag indicating whether the absolute value of a coefficient level is greater than 1.
3) coeff_abs_level_greater2_flag: a flag indicating whether the absolute value of a coefficient level is greater than 2.
4) coeff_sign_flag: a sign of a significant coefficient (0: positive, 1: negative)
5) coeff_abs_level_remaining: the remaining value for absolute value of a coefficient level (if value is larger than that coded in previous passes).

The bins in the first 3 passes are arithmetically coded in the regular mode (use context) and the bins in scan paths 4 and 5 are arithmetically coded in the bypass mode. Grouping bypass bins can increase the throughput of the entropy coder.

In the current HEVC standard, residuals in a TU is coded in the CG basis and the CGs are coded one by one according to CG scan path, where the CG scan path refers to the scan order for the CGs within a TU. Therefore, while the bypass bins within a CG are grouped together, the regular mode bins and bypass bins in a TU are still interleaved.

For each CG, depending on a criterion, coding the sign of the last non-zero coefficient is omitted when sign data hiding is applied. The sign value is derived by the parity of the sum of the levels of the CG, where an even parity corresponds to the positive sign and an odd parity corresponds to the negative sign. The criterion is the distance in scan order between the first and last non-zero coefficients. If the distance is larger than a threshold (i.e., 4 in HEVC), then sign data hiding is applied.

Figure 3:
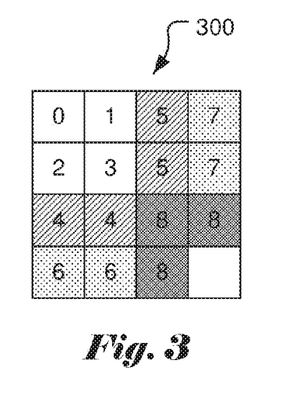
FIG. 3 illustrates the significant flag context assignment for the 4×4 transform block (TB) according to the High Efficiency Video Coding (HEVC) standard.
Figure 4:
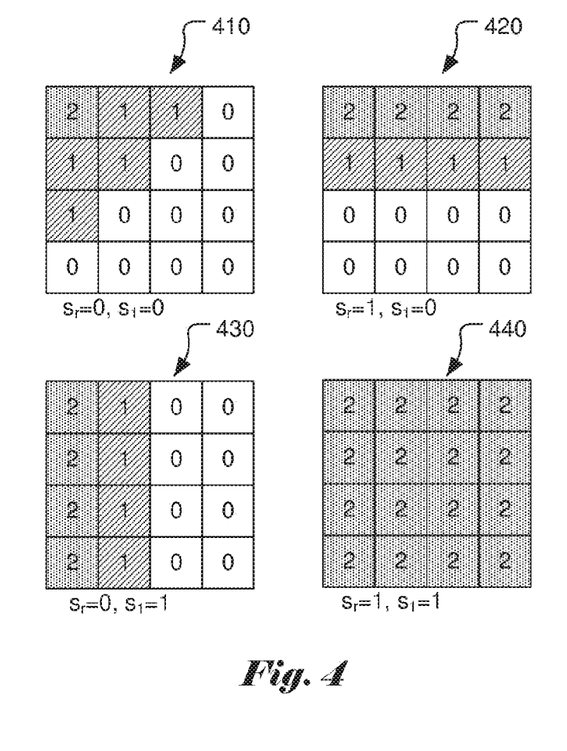
FIG. 4 illustrates the significant flag context assignment for the 8×8, 16×16, and 32×32 transform blocks (TBs) according to the High Efficiency Video Coding (HEVC) standard, where context depends on the significance of the neighbouring right ($s_r$) and lower ($s_l$) coding groups (CGs) and the coefficients positions in current CG.

The context model of significant_coeff_flag for a 4×4 TB (Transform Block) depends on the position of the coefficient within the TB. Coefficient positions are grouped according to their frequency and the significant flags within a group are coded using the same context. FIG. 3 shows the context modelling for a 4×4 TB 300, where the number in each small square corresponds to the context index of a corresponding coefficient. Luma and chroma components are treated in the same way, but use separate context sets. For 8×8, 16×16 and 32×32 TBs, context modelling is based on both position and template. As shown in FIG. 4, a context is selected depending on a template of the neighbouring right and lower CSBF (Coded Sub Block Flag), $s_r$ and $s_l$. For TB 410, CSBF $s_r$ is equal 0 and $s_l$ is equal to 0. For TB 420, CSBF $s_r$ is equal 1 and $s_l$ is equal to 0. For TB 430, CSBF $s_r$ is equal 0 and $s_l$ is equal to 1. For TB 440, CSBF $s_r$ is equal 1 and $s_l$ is equal to 1. Besides, TBs are split into two regions, the top leftmost sub-block is region 1, and the rest of sub-blocks make up region 2. For luma component, region 1 and region 2 use separate context sets. For chroma components, contexts for region 1 and region 2 are shared. The DC component has a single dedicated context and is shared across all TB sizes.

When coding the absolute level, there are 4 different context sets for the luma component and 2 context sets for the chroma component. Each set has 4 context models for coeff_abs_level_greater1_flag and 1 context for coeff_abs_level_greater2_flag. A context set is selected depending on whether there is a coeff_abs_level_greater1_flag equal to 1 in the previous CG. For the luma component, the context set selection also depends on whether DC coefficient is part of current CG. For the chroma component, the context set does not depend on the CG location. The specific context within a context set for coeff_abs_level_greater1_flag is selected depending on the number of trailing zeros and the number of coefficient levels larger than 1 in the current CG.

Figure 5:
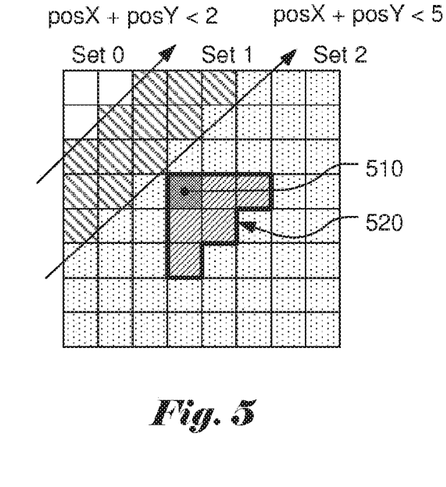
FIG. 5 illustrates an example of multiple context sets according to the location of the syntax element and an example of template used in context modelling.

During the HEVC development, other context modelling methods have also been disclosed. For example, Nguyen et al., discloses three context sets depending on regions for significant_coeff_flag in JCTVC-H0228 (Non-CE11: Proposed Cleanup for Transform Coefficient Coding, Joint Collaborative Team on Video Coding (JCT-VC) of ITU-T SG16 WP3 and ISO/IEC JTC1/SC29/WG11, 8th Meeting: San Jose, Calif., USA, 1-10 Feb. 2012, Document: JCTVC-H0228). The first region (i.e., Set 0) includes all positions with posX+posY<2, where posX and posY are the horizontal and vertical indices of the coefficient matrix with (0,0) being the upper left corner location. The second region (i.e., Set 1) includes all positions with posX+posY<5 and not in Set 0. The remaining positions belong to the third region (i.e., Set 2). FIG. 5 illustrates the three regions according to JCTVC-H0228. The 4×4 and 8×8 TU use separate context sets, and others share the same context. The context selection is based neighbouring samples within a "local template". According to JCTVC-H0228, the local template 520 for a current sample location 510 includes 5 neighbouring samples (i.e., samples shown as slant-lined squares) in the local template as shown in FIG. 5. Up to 6 contexts are used depending on the statistics of the levels of samples in the local template. The context modelling for significant_coeff_flag according to JCTVC-H-0228 has very high complexity. Also it is interleaved with bypass bins.

In Key Technical Areas (KTA) for HEVC proposed by Qualcomm (Further improvements to HMKTA-1.0, VCEG-AZ07, June 2015), the context modelling for significant_coeff_flag is modified so that significant_coeff_flag is not interleaved with the bypass bins. While up to 6 contexts may be used, the contexts are selected depending on the statistics of the bins of samples in the local template.

From the above descriptions, the context model derivation for significant_coeff_flag can be done in parallel for all samples in one CG. However, the context model derivation for syntax element coeff_abs_level_greater1_flag depends on previously decoded bins of the same syntax element. In this example, it illustrates data dependency in existing entropy modelling.

The context Sets for a CG for coeff_abs_level_greater1_flag according to HEVC is shown in Table 1. The meaning of the context model is shown in Table 2.

TABLE 1

Context Sets for a CG

| | Luma | | Chroma | |
|---|---|---|---|---|
| # of coeff_abs_level_greater1_flag = 1 in previous CG | 0 | >0 | 0 | >0 |
| Region 1 (top left CG) | 0 | 1 | 4 | 5 |
| Region 2 (other CGs) | 2 | 3 | 4 | 5 |

TABLE 2

| Context Model | Description |
|---|---|
| 0 | 1 or more larger than 1 |
| 1 | Initial - no trailing zeros |
| 2 | 1 trailing zero |
| 3 | 2 or more trailing zeros |

The context Sets for a CG for coeff_abs_level_greater2_flag according to HEVC is shown in Table 3. The meaning of the context model is shown in Table 2. There is only 1 context for each set.

TABLE 3

Context Sets for a CG

| | Luma | | Chroma | |
|---|---|---|---|---|
| # of coeff_abs_level_greater1_flag = 1 in previous CG | 0 | >0 | 0 | >0 |
| Region 1 (top left CG) | 0 | 1 | 4 | 5 |
| Region 2 (other CGs) | 2 | 3 | 4 | 5 |

It is desirable to develop context model that can remove certain data dependency. In the example of transform coefficient coding, it is desirable to develop context model for coeff_abs_level_greater1_flag and other coefficient parameters so that the context model does not depend on previously decoded bins of the same syntax element.

BRIEF SUMMARY OF THE INVENTION

A method and apparatus of video or image coding using context modeling for video or image data are disclosed. According to the present invention, a selected context is determined from a context set for a first syntax element at a first location based on statistics of one or more second syntax elements at one or more second locations within a predefined region. The first syntax element is different from the second syntax element. The first syntax element is then encoded or decoded according to the selected context.

In one embodiment, the syntax elements are associated with transform coefficients in a TU (transform unit) or a CG (coding group) in the current picture. The first syntax element indicates whether a first transform coefficient at a first location is greater than 1 when the first transform coefficient is non-zero, and each second syntax element indicates whether each second transform coefficient at each second location is non-zero. A sum of values of the second syntax elements at the second locations within the predefined region is determined and the sum of values of the second syntax elements is used to derive a context index to select a target context from the context set according to a mapping function. The second syntax element has a value of 1 if the corresponding second transform coefficient is non-zero. Otherwise, the second syntax element has a value of 0.

In another embodiment, the first syntax element indicates whether a first transform coefficient at a first location is greater than 2 when the first transform coefficient is greater than 1, and each second syntax element indicates whether each second transform coefficient at each second location is non-zero. In yet another embodiment, the first syntax element indicates whether a first transform coefficient at a first location is greater than 2 when the first transform coefficient is greater than 1, and each second syntax element indicates whether each second transform coefficient at each second location is greater than 1 when each second transform coefficient is non-zero.

For two different first syntax elements, different mapping functions, different predefined regions can be used. Multiple candidate predefined regions can be used and selection among the multiple candidate predefined regions can be signaled in a video bitstream comprising the current picture. The predefined region can be constrained not to cross a sub-block boundary. Furthermore, the predefined region can be signaled in a video bitstream comprising the current picture.

In one embodiment, multiple context sets for the first syntax element are used and selection among the multiple context sets depends on the first location. For example, the first location is designated as (x,y) and three context sets are used; if x+y<R2, context set 2 is used; otherwise, if x+y<R1, context set 1 is used; else context set 0 is used; and wherein R2 is smaller than R1. Furthermore, for two different first syntax elements, either a same set of R1 and R2 or different sets of R1 and R2 can be used for the two different syntax elements.

In another embodiment, multiple context sets for the first syntax element are used and one of the multiple context sets is selected depending on one or more coding parameters. For example, the coding parameters comprise a block size corresponding to a CU (coding unit) or a TU (transform unit). If three context sets for the first syntax element are used, the three context sets can be selected according to whether width and height of the block size are the same, whether the width is greater than the height of the block size, or whether the width is smaller than the height of the block size respectively.

The syntax elements can be associated with samples in a block corresponding to prediction residuals without transform process and quantization. The syntax elements may also be associated with samples in a block corresponding to original pixel data.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 6:
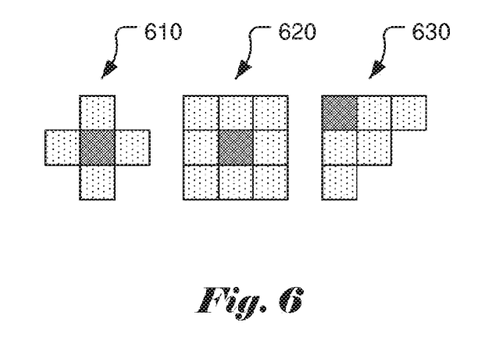
FIG. 6 illustrates examples of template used in context modelling.

As mentioned before, the context modelling used in advanced coding techniques such as the High Efficiency Video Coding (HEVC) has data dependency. Accordingly, the present invention discloses a new context modelling method that removes the data dependency as well as introduces new features that may improve the coding performance. In one embodiment of the present invention, context model assignment of syntax element A at location (x,y) depends on the statistics of another syntax element B or a group of syntax elements, {B∈Φ}. The statistics is obtained within a predefined region (i.e., template or local template) Ω. FIG. 6 illustrates three examples of templates (610, 620 and 630) for a current position (x,y) indicated by the darker block.

In one embodiment, the context index ctx is calculated as follows:

$$patternSum = \sum_{(m,n)\in\Omega} \delta(m, n) \quad (1)$$

$$ctx = f(patternSum) \quad (2)$$

The symbol $\delta(m,n)$ denotes the value of syntax element B or the value of the group of syntax elements $\{B \in \Phi\}$. On the other hand, f(patternSun) is a function of patternSun.

In another embodiment, different context sets can be used, depending on the location (x,y). For example, if x+y is smaller than R2, then context set 2 is used. Otherwise, if x+y is smaller than R1, then context set 1 is used. Else, context set 0 is used. Therefore, $$ctx = ctx + (x+y < R2 ? 2*N : (x+y < R1 ? N : 0)).$$

N is the number of context in one context set. The number R2 and R1 can be predefined. For example, R2 is equal to 3 and R1 is equal to 10. In another example, only two context sets are used. For example, if x+y is smaller than R1, context set 1 is used. Otherwise, context set 0 is used.

In yet another embodiment, the syntax element A corresponds to coeff_abs_level_greater1_flag, and syntax element B corresponds to significant_coeff_flag.

In yet another embodiment, the syntax element A corresponds to coeff_abs_level_greater2_flag, and syntax element B corresponds to significant_coeff_flag.

In yet another embodiment, the syntax element A corresponds to coeff_abs_level_greater2_flag, and syntax element B corresponds to coeff_abs_level_greater1_flag.

In another embodiment, the syntax element A corresponds to coeff_abs_level_greater2_flag, and the group of syntax elements $\Phi$ are {significant_coeff_flag, coeff_abs_level_greater1_flag}.

In still another embodiment, the same or different f can be applied when coding different syntax elements.

In still another embodiment, the same or different values of R2 and R1 can be applied when coding different syntax elements.

In still another embodiment, the same or different regions, $\Omega$ can be applied when coding different syntax elements. The region $\Omega$ can be constrained such that it does not cross a sub-block.

In still another embodiment, the proposed method can be applied not only for coding transform coefficients, but also for image block data (either original signal or prediction residual).

An example of context modelling for syntax element coeff_abs_level_greater1_flag is shown as follows. The symbol $\delta(m,n)$ denotes the value of significant_coeff_flag. The local template 630 as shown in FIG. 6 is used. The context index is calculated as:

$$ctx = \min(patternSum, 4) \quad (3)$$

$$ctx = ctx + (x+y < 3 ? 10 : (x+y < 10 ? 5 : 0)) \quad (4)$$

In the above example, the context modelling for coeff_abs_level_greater1_flag is dependent on the statistics of the significant_coeff_flag in the template. Accordingly, parallel processing of coeff_abs_level_greater1_flag for multiple sub-blocks is possible based on the present invention. On the other hand, for the conventional template based method in KTA or JEM (Joint Exploration Model), the context modelling for coeff_abs_level_greater1_flag is dependent on the statistics of the bins in the template, which prevents the coeff_abs_level_greater1_flag from being parallel processed.

An example of context modelling for syntax element coeff_abs_level_greater2_flag is shown as follows. The symbol $\delta(m,n)$ denotes the value of significant_coeff_flag. The local template 630 as shown in FIG. 6 is used. The context index is calculated as:

$$ctx = \min(patternSum, 4) \quad (5)$$

$$ctx = ctx + (x+y < 3 ? 10 : (x+y < 10 ? 5 : 0)) \quad (6)$$

In another example, equation (5) and (6) can be replaced by:

$$ctx = patternSum >= 4 \quad (7)$$

$$ctx = ctx + (x+y < 3 ? 2 : 0) \quad (8)$$

In the above example, the context modelling for coeff_abs_level_greater2_flag is dependent on the statistics of the significant_coeff_flag in the template. Accordingly, parallel processing of coeff_abs_level_greater2_flag for multiple sub-blocks is possible based on the present invention. On the other hand, for the conventional template based method in KTA or JEM (Joint Exploration Model), the context modelling for coeff_abs_level_greater2_flag is dependent on the statistics of the bins in the template, which prevents the coeff_abs_level_greater2_flag from being parallel processed.

Figure 7:
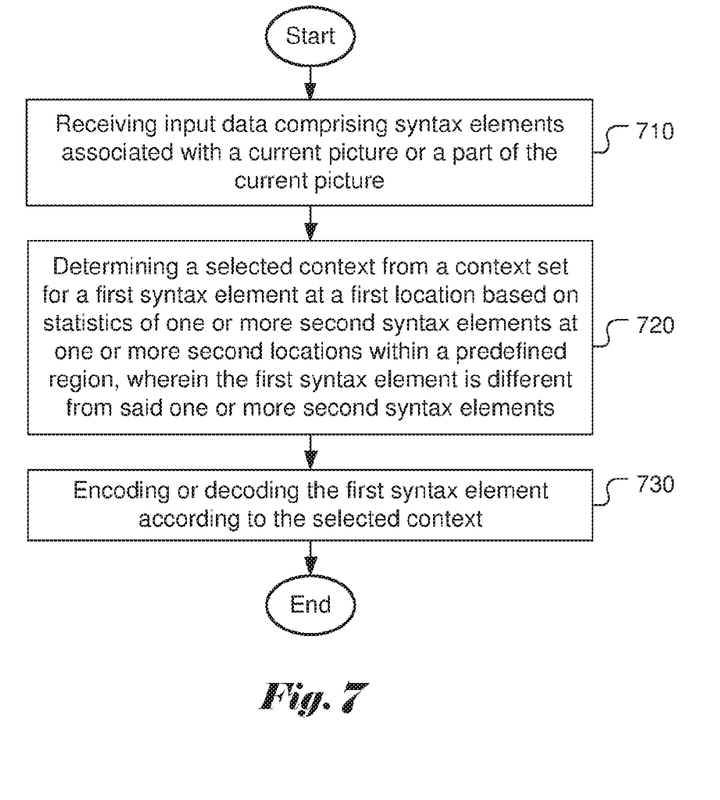
FIG. 7 illustrates an exemplary flowchart for a video coding system utilizing context modelling according to an embodiment of the present invention.

FIG. 7 illustrates an exemplary flowchart for a video coding system utilizing context modelling according to an embodiment of the present invention. Input data comprising syntax elements associated with a current picture or a part of the current picture is received in step 710. A selected context is determined from a context set for a first syntax element at a first location based on statistics of one or more second syntax elements at one or more second locations within a predefined region in step 720, where the first syntax element is different from said one or more second syntax elements. The first syntax element is then encoded or decoded according to the selected context in step 730.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video or image coding using context modeling for video or image data, the method comprising:
   receiving input data comprising syntax elements associated with a current picture or a part of the current picture;
   determining a selected context from a context set for a first syntax element at a first location based on statistics of one or more second syntax elements at one or more second locations within a predefined region, wherein the first syntax element is different from said one or more second syntax elements; and
   encoding or decoding the first syntax element according to the selected context.

2. The method of claim 1, wherein the syntax elements are associated with transform coefficients in a TU (transform unit) or the transform coefficients in a current CG (coding group) of the TU in the current picture.

3. The method of claim 1, wherein the first syntax element indicates whether a first transform coefficient at the first location is greater than 1 when the first transform coefficient is non-zero, and each second syntax element indicates whether each second transform coefficient at each second location is non-zero.

4. The method of claim 3, wherein a sum of values of said one or more second syntax elements at said one or more second locations within the predefined region is determined and the sum of values of said one or more second syntax elements is used to derive a context index to select a target context from the context set according to a mapping function, and wherein one second syntax element has a value of 1 if one corresponding second transform coefficient is non-zero and one second syntax element has a value of 0 if one corresponding second transform coefficient is zero.

5. The method of claim 1, wherein the first syntax element indicates whether a first transform coefficient at the first location is greater than 2 when the first transform coefficient is greater than 1, and each second syntax element indicates whether each second transform coefficient at each second location is non-zero.

6. The method of claim 1, wherein the first syntax element indicates whether a first transform coefficient at a first location is greater than 2 when the first transform coefficient is greater than 1, and each second syntax element indicates whether each second transform coefficient at each second location is greater than 1 when each second transform coefficient is non-zero.

7. The method of claim 1, wherein the first syntax element corresponds to one of two different syntax elements and mapping function is different for the two different syntax elements.

8. The method of claim 1, wherein multiple context sets for the first syntax element are used and selection among the multiple context sets depends on the first location.

9. The method of claim 8, wherein the first location is designated as (x,y) and three context sets are used; if x+y<R2, context set 2 is used; otherwise, if x+y<R1, context set 1 is used; else context set 0 is used; and wherein R2 is smaller than R1.

10. The method of claim 9, wherein the first syntax element corresponds to one of two different syntax elements, and wherein either a same set of R1 and R2 or different sets of R1 and R2 are used for the two different syntax elements.

11. The method of claim 1, wherein the first syntax element corresponds to one of two different syntax elements and the predefined region is different for the two different syntax elements.

12. The method of claim 1, wherein a sum of values of said one or more second syntax elements at said one or more second locations within the predefined region is determined and the sum of values of said one or more second syntax elements is used to derive a context index to select a target context from the context set according to a mapping function.

13. The method of claim 1, wherein multiple context sets for the first syntax element are used and one of the multiple context sets is selected depending on one or more coding parameters, and wherein said one or more coding parameters comprise a block size corresponding to a CU (coding unit) or a TU (transform unit).

14. The method of claim 13, wherein three context sets for the first syntax element are used and three context sets are selected according to whether width and height of the block size are the same, whether the width is greater than the height of the block size, or whether the width is smaller than the height of the block size respectively.

15. The method of claim 1, wherein the predefined region is constrained not to cross a sub-block boundary.

16. The method of claim 1, wherein the predefined region is signaled in a video bitstream comprising the current picture.

17. The method of claim 1, wherein multiple candidate predefined regions are used and selection among the multiple candidate predefined regions is signaled in a video bitstream comprising the current picture.

18. The method of claim 1, wherein the syntax elements are associated with samples in a block corresponding to prediction residuals without transform process and quantization.

19. The method of claim 1, wherein the syntax elements are associated with samples in a block corresponding to original pixel data.

20. An apparatus for video or image coding using context modeling of video or image data, the apparatus comprising one or more electronic circuits or processors arranged to:
    receive input data comprising syntax elements associated with a current picture or a part of the current picture;
    determine a selected context from a context set for a first syntax element at a first location based on statistics of one or more second syntax elements at one or more second locations within a predefined region, wherein the first syntax element is different from said one or more second syntax elements; and
    encode or decode the first syntax element according to the selected context.

\* \* \* \* \*